July 16, 1957      V. L. FRANTZ      2,799,596
PRESSURE SENSITIVE ADHESIVE TAPE
Filed Oct. 23, 1953
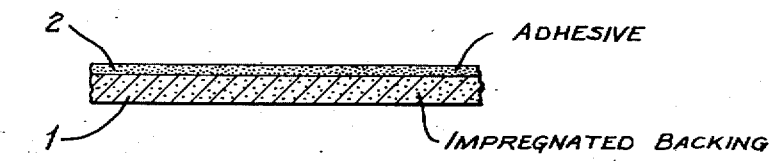
INVENTOR.
VERNE L. FRANTZ
BY
Morgan, Finnegan, Durham & Pine
ATTORNEYS.

United States Patent Office 2,799,596
Patented July 16, 1957

2,799,596
PRESSURE SENSITIVE ADHESIVE TAPE

Verne L. Frantz, Deans, N. J., assignor to Permacel Tape Corporation, a corporation of New Jersey Application October 23, 1953, Serial No. 388,050

5 Claims. (Cl. 117—76)

This invention relates to normally tacky and pressure-sensitive adhesive tape and to the preparation of fibrous fabric, whether woven or non-woven, for use as a backing for such tape. In some of its most important aspects the invention is concerned with pressure-sensitive adhesive tape for use in the electrical industry.

In addition to having good adhesive properties, pressure-sensitive adhesive tape used in the electrical industry, and particularly in the manufacture of electrical equipment, should be stiff and insensitive to moisture. Stiffness is needed, particularly where automatic equipment is used, to dispense or apply the tape. Minimum sensitivity to moisture is necessary so as to prevent an adverse effect upon the electrical insulating properties of tape at high humidity. Much adhesive tape is impregnated with water soluble impregnants, and these impregnants are undesirable for electrical purposes because they attract and hold moisture. Water soluble resins of the type used in the textile industry, on the other hand, form poor impregnants for pressure-sensitive adhesives because they are attracted to these adhesives and form chemical and mechanical bonds, making it difficult to unroll or unstick the adhesive tape due to the firm bond between adhesive and both sides of the backing.

In accordance with the invention, the backing of the adhesive sheet is treated with a mixture of a certain class of polyamide resins with thermosetting resins. The treatment is generally applied by immersing the fibrous backing in a resin solution including the polyamide and then drying it by passing it through a suitable oven.

The polyamide resins employed in this invention are represented by the formula:

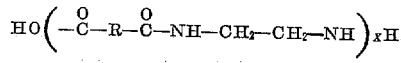

where X is at least five and not more than fifteen. Such resins are made by the reaction of dimerized and trimerized unsaturated fatty acids of vegetable oils with ethylene diamine. The use of this particular class of polyamides is particularly beneficial in fibrous cloth tape, even if this tape is not used in the electrical industry, because of the easy release of the adhesive from the backing obtained during unrolling of the tape.

Among the preferred polyamides are Polyamides #93, #94, #95 and #100 manufactured by the Chemical Division of General Mills, Inc. The main difference between these grades are viscosity, melting point and average molecular weight. Adhesive tape made from cloth to which a treating agent including any of these resins had been applied was satisfactory, although the best properties were obtained on use of Polyamide #93. The preferred polyamides are soluble at room temperature in the following solvents: acetic acid, n-butanol, chlorobenzene, chloroform, cyclohexanol, isobutanol, isopropanol, methylene chloride, methyl isobutyl carbinol, trichlorethylene, various mixtures of isopropanol and toluene, and various mixtures of textile spirits and ethanol. What solvent is used for sizing is not material except that, of course, solvents that affect a particular fabric adversely should not be used with that fabric.

The concentration of the total resin impregnant in the solution may vary from about one percent by weight to about forty percent, depending upon the stiffness desired in the finished backing. The amount of impregnant applied to the backing may vary from about one hundredth of one percent by weight to about fifty percent of the weight of the finished impregnated fabric, depending upon the type of fabric used.

Concentrations of resins in solutions exceeding twenty-five percent can be used but frequently produce cloth too stiff to be used conveniently as a backing for pressure-sensitive adhesive tape.

If polyamide resins alone are used, the adhesive sometimes has a tendency to loosen from the backing when the polyamides which are thermoplastic reach their melting point. Therefore, in accordance with the invention, it is preferred to use various mixtures of polyamide resin and thermosetting resin as a sizing material and applied from the solution comprising the polyamide resin. In some cases the polyamide resin acts as a plasticizer for the thermosetting resins, and in others it actually reacts with the thermosetting resin, forming a thermosetting reaction product suitable as impregnant for the fibrous backing used as pressure-sensitive adhesive tape backing. It is desirable that the impregnant be of thermosetting nature after application to the cloth backing. It is not necessary that the impregnant set before or during the adhesive coating operation, but it is desirable that the combination of resins become thermosetting at the completion of the heating cycle given the tape in its application. All types of additives can be used with the resins in the impregnants in small amounts, and in some instances they contribute to easier release of the adhesive, facilitating unrolling of the tape roll. Among such additives are all types of fillers such as titanium dioxide, calcium carbonate, zinc oxide and various plasticizers such as stearic acid, castor oil, zinc stearate, aluminum stearate and lanolin.

The thermosetting resins that have proven of greatest value in the invention are certain phenolics and certain epoxy resins. Among the phenolics the preferred ones are para substituted phenol aldehydes such as para-tertiary butyl and para-tertiary amyl phenol aldehydes. The length of the alkyl substitution chain may vary from propyl to decyl. The alkylated phenol is reacted with an excess over an equimolar amount of formaldehyde in the presence of an alkaline catalyst and then neutralized. Further details of such resins can be found in U. S. Patents 1,800,295; 1,800,296; 1,996,069; 2,058,797; 2,079,210; 2,123,898; 2,139,081; 2,101,944; 2,112,022; 2,211,408. An example of the preparation of a resin of this type follows:

Pure phenol is heated at 50 degrees centigrade, with about fifty parts by weight of tung oil for two hours. It is then cooled to fifty degrees centigrade, and formaldehyde is added in excess of equimolar amount based on the phenol, and about one half of one percent sodium hydroxide is added as a catalyst. The mixture is heated to ninety degrees centigrade until the free formaldehyde is three percent or less, then evaporated under vacuum until a heavy body is obtained. It is then poured out and cooled. An example is Barrett Division's R-152.

The epoxy resins have structures as follows:

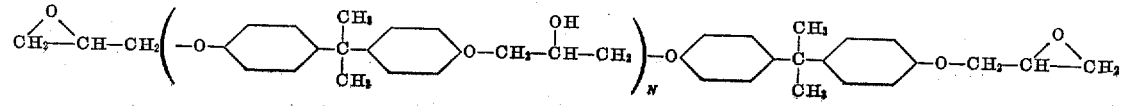

and are usually made by the condensation of bisphenol and epichlorohydrin.

Conventional pressure-sensitive adhesives may be employed in the formation of tapes in accordance with this invention and, as known, may include in the composition as the elastomeric component the following:

1. Natural rubber
2. Copolymers of butadiene and styrene comprising at least 30% by weight of butadiene
3. Polybutadiene
4. Polyisobutylene
5. Alkyl vinyl ether polymers wherein the alkyl constituent comprises one to seven carbon atoms.

I mean to include butyl rubber and products of joint polymerization corresponding substantially to two or more of the above unsaturated substances and mixtures of two or more polymeric substances such as mentioned above. Materials other than those mentioned specifically may be present in the polymerized product.

Various fabrics which have been impregnated or sized with polyamide, and a combination of polyamide and a heat curing resin are: cotton, rayon, glass, Dacron, nylon, and saran. Other fabric or combination of the above fabrics can be sized with the above resins and be used as backings for pressure-sensitive tape, provided a solvent is used for the polyamide that does not attack the fabric.

*Example I*

Completely desized and singed 80 x 80 cotton cloth was sized by passing it through a solution made up as below, and then dried at 200 degrees Fahrenheit for two minutes.

| | Parts by weight |
|---|---|
| Polyamide resin #93 | 2.5 |
| Oil soluble, heat reactive phenolic | 1.5 |
| Isopropanol | 28 |
| Toluene | 67 |

An adhesive was then coated on this cloth to make a pressure-sensitive tape. Any of the rubber based adhesives commonly used for this purpose may be applied; however, in this example, an adhesive of the following formula was used.

| | Parts |
|---|---|
| Butadiene-styrene copolymer rubber (50:50 ratio; Mooney 50) | 25 |
| Pale crepe rubber | 25 |
| Zinc oxide | 40 |
| Antioxidant | 1 |
| Hard polyterpene | 16 |
| Hydrogenated rosin glyceride | 20 |
| Thermosetting phenolic resin | 5 |
| Zinc resinate | 5 |

This construction produced a thermosetting electrical pressure-sensitive tape and had three distinct advantages over a similar product made from the same cloth sized with starch, namely: (1) greater stiffness, (2) higher electrical insulation resistance at ninety-six percent relative humidity, (3) greater ease of unrolling tape.

*Example II*

Glass cloth was sized by passing through a solution made up as follows:

| | Parts |
|---|---|
| Polyamide #94 | 4 |
| Isopropanol | 96 |

It was then dried, and coated with a pressure-sensitive adhesive of the rubber-base type made as follows:

| | Parts |
|---|---|
| Butadiene-styrene rubber (75:25 ratio; Mooney 90) | 25 |
| Pale crepe rubber | 25 |
| Zinc oxide filler | 42 |
| Antioxidant | 1 |
| Hydrogenated rosin glyceride | 24 |
| Hard polyterpene resin | 21 |

In the case of glass cloth there is no initial sizing present, and a size is necessary in order to hold the fibers in place as well as to give the finished tape stiffness. Since it is used in electrical applications, it needs the property of moisture resistance.

This tape, made to the above formulation, proved satisfactory from the standpoint of insulation resistance at ninety-six percent relative humidity, stiffness and ease of unrolling.

*Example III*

Actate rayon cloth was sized by passing it through a polyamide resin solution made up as follows:

| | Parts |
|---|---|
| Polyamide resin #95 | 8 |
| Toluene | 92 |

It was dried and coated with an adhesive formulated as follows:

| | Parts |
|---|---|
| Butadiene-styrene copolymer (75:25 ratio; Mooney 70) | 25 |
| Pale crepe rubber | 25 |
| Zinc oxide | 42 |
| Polyterpene resin | 21 |
| Hydrogenated rosin ester | 24 |

This produced a thoroughly satisfactory acetate rayon electrical tape. The electrical insulation of this tape was over 100,000 megohms/inch width at ninety-six percent relative humidity as compared to 83,000 megohms for a control using the same lots of cloth and adhesive but without sizing. Stiffness and ease of unrolling the tape were comparatively more desirable on the tape which was made with the sized backing.

*Example IV*

Actate rayon cloth was sized by passing it through a solution made up as follows:

| | Parts |
|---|---|
| Polyamide #100S | 2 |
| Thermosetting epoxy resin as described (average molecular weight 1400; melting point 97–103 degrees centigrade; specific gravity 1.154) | 1 |
| Isopropanol | 97 |

It was dried and coated with an adhesive formulated as follows:

| | Parts |
|---|---|
| Butadiene styrene copolymer (79:21 ratio; Mooney 80) | 30 |
| Pale crepe rubber | 30 |
| Aluminum hydrate | 30 |
| Antioxidant | 1 |
| Hydrogenated rosin ester | 25 |
| Polyterpene | 32 |

This tape was entirely satisfactory and showed improved properties with respect to stiffness, ease of roll unwinding, and electrical insulation.

*Example V*

Dacron fabric, manufactured by E. I. du Pont de Nemours & Company as Number 615J, was sized with a solution formulated as follows:

| | Parts |
|---|---|
| Polyamide #95 | 7.5 |
| Oil soluble, heat hardening phenolic | 1.5 |
| Isopropanol | 29 |
| Toluene | 67 |

It was dried and coated with an adhesive with the following general formula:

| | Parts |
|---|---|
| Pale crepe rubber | 66 |
| Aluminum hydrate | 38 |
| Wool fat | 7 |
| Antioxidant | 2 |
| Polyterpene | 15 |
| Hydrogenated rosin ester | 10 |
| Oil-soluble heat hardening phenolic | 10 |
| Zinc stearate | 19 |

*Example VI*

Cotton cloth (68 x 72 thread count) was sized by immersing it through a solution formulated as follows:

| | Parts |
|---|---|
| Polyamide #95 | 12 |
| Oil-soluble, heat-reactive phenolic | 4 |
| N-butanol | 84 |

It was then dried and coated with a mass with the following general formulation.

| | Parts |
|---|---|
| Pale crepe rubber | 60 |
| Aluminum hydrate | 28 |
| Antioxidant | 1 |
| Polyterpene resin | 78 |
| Oil-soluble heat-hardening phenolic resin | 14 |
| Plasticizer | 6 |
| Vegetable fat | 8 |

This construction produced a tape that was very satisfactory and was easier to unroll than a tape of the same construction except that the cotton was not sized with the polyamide solution.

The use of the resins described in this invention as a size for fabrics has no effect on the method used for applying the adhesive mass, and any method used to coat the unsized fabric is applicable to the same fabric sized with these resins. The examples cited were coated by calendering, and by reverse roll coating from toluene. Good anchorage of the adhesive to the backing was obtained from both methods.

Reference is now made to the accompanying drawing which is a cross-sectional view of a normally tacky and pressure-sensitive adhesive tape of the present invention. The tape comprises a backing 1 impregnated in a manner described hereinabove in detail and having thereon a coating 2 of a normally tacky and pressure-sensitive adhesive.

The invention has been described in several of its preferred forms. Modifications will occur readily to those skilled in the art and are included within the inventive concept.

The claims are:

1. A normally tacky and pressure-sensitive adhesive tape comprising a fibrous web backing and a normally tacky and pressure-sensitive adhesive coated on a major surface thereof, said web being impregnated in amount approximately 0.01 to 50% by weight of the impregnated web with a composition comprising a resin which is the reaction product of polymerized fatty acids of vegetable oils and ethylene diamine and a water-insoluble, compatible, heat-advancing and thermosetting resin selected from the group consisting of heat-advancing phenolic-aldehyde resins and heat-advancing epoxy resins, said impregnated web having the characteristics of a lack of affinity for said adhesive and enabling easy removal of the adhesive layer from the surface of an underlying ply of said tape.

2. A normally tacky and pressure-sensitive adhesive tape in accordance with claim 1 wherein the thermosetting resin is a heat-advancing phenolic-aldehyde resin.

3. A normally tacky and pressure-sensitive adhesive tape in accordance with claim 1 wherein the thermosetting resin is a heat-advancing epoxy resin.

4. A normally tacky and pressure-sensitive adhesive tape according to claim 3 wherein the adhesive contains a heat-advancing phenolic-aldehyde resin.

5. A normally tacky and pressure-sensitive adhesive tape according to claim 2 wherein the adhesive contains a heat-advancing phenolic-aldehyde resin.

References Cited in the file of this patent

UNITED STATES PATENTS

| 2,484,416 | Martin | Oct. 11, 1949 |
|---|---|---|
| 2,495,008 | Keaton | Jan. 17, 1950 |

OTHER REFERENCES

Polyamide Resin Suspensoids, Revision D, New Product Data Sheet, General Mills Inc., 1950, pp. 13 and 15.

U. S. DEPARTMENT OF COMMERCE
PATENT OFFICE

CERTIFICATE OF CORRECTION

Patent No. 2,799,596                                         July 16, 1957

Verne L. Frantz

It is hereby certified that error appears in the printed specification of the above numbered patent requiring correction and that the said Letters Patent should read as corrected below.

Column 2, line 54, for the patent number, "2,211,408" read -- 2,211,048 --; Column 2, line 57, for "50 degrees centigrade," read -- 150 degrees centigrade, --.

Signed and sealed this 18th day of March 1958.

(SEAL)

Attest:
KARL H. AXLINE
Attesting Officer

ROBERT C. WATSON
Commissioner of Patents